(12) United States Patent
Fedora et al.

(10) Patent No.: US 7,425,902 B2
(45) Date of Patent: Sep. 16, 2008

(54) SYSTEMS AND METHODS FOR EVALUATING GEOLOGICAL MOVEMENTS

(75) Inventors: Neal R. Fedora, Clearwater, FL (US); Zygmunt Zubkow, Palm Harbor, FL (US)

(73) Assignee: Honeywell International Inc., Morristown, NJ (US)

( * ) Notice: Subject to any disclaimer, the term of this patent is extended or adjusted under 35 U.S.C. 154(b) by 189 days.

(21) Appl. No.: 11/282,360

(22) Filed: Nov. 18, 2005

(65) Prior Publication Data

US 2008/0094242 A1    Apr. 24, 2008

(51) Int. Cl.
*G08B 21/00* (2006.01)
(52) U.S. Cl. ......................................... 340/690; 702/14
(58) Field of Classification Search ................. 340/690; 367/14, 16, 38, 56; 702/14, 17
See application file for complete search history.

(56) References Cited

U.S. PATENT DOCUMENTS

| | | | |
|---|---|---|---|
| 5,585,566 A * | 12/1996 | Welles et al. ................. | 340/690 |
| 5,694,129 A * | 12/1997 | Fujinawa et al. ............. | 340/690 |
| 5,742,166 A * | 4/1998 | Park ........................... | 340/690 |
| 5,920,828 A * | 7/1999 | Norris et al. .................. | 702/14 |
| 6,014,101 A * | 1/2000 | Loomis ....................... | 701/214 |
| 6,188,962 B1 * | 2/2001 | Morgan et al. ................ | 702/14 |
| 6,497,656 B1 * | 12/2002 | Evans et al. .................. | 128/903 |
| 6,714,480 B2 * | 3/2004 | Sinha et al. .................. | 702/18 |
| 6,870,482 B2 * | 3/2005 | Cherry ....................... | 340/690 |
| 6,999,377 B2 * | 2/2006 | Burkholder et al. ........... | 702/14 |

* cited by examiner

*Primary Examiner*—John A Tweel, Jr.
(74) *Attorney, Agent, or Firm*—Fogg & Powers LLC (57) ABSTRACT

Systems and methods for monitoring and tracking transients caused by geological events are provided. In one embodiment, a geological event monitoring system is provided. The system comprises a sensor array having a plurality of geologic activity sensors adapted to receive positioning signals from one or more Earth orbiting satellites and further adapted to receive a resolution enhancement signal from at least one reference station, the geologic activity sensors further adapted to measure motion activity; and a central monitoring system adapted to communicate with the sensor array, wherein the sensor array measures motion activity at a plurality of locations and transmits time stamped data characterizing the motion activity at the plurality of locations to the central monitoring system, the central monitoring system further adapted to correlate the time stamped data and track movement and inertial forces experienced by the plurality of geologic activity sensors over time.

21 Claims, 5 Drawing Sheets

SYSTEMS AND METHODS FOR EVALUATING GEOLOGICAL MOVEMENTS

TECHNICAL FIELD

The present invention generally relates to detection of geological events and more specifically to systems and methods for evaluating geological movements.

BACKGROUND

The foremost theories on volcanic eruptions conclude that seismic resonance is a precursor to volcanic eruptions. Specifically, low-frequency seismic event are common features accompanying volcanic eruptions as magma swelling up from within the earth finds a path to the surface. These seismic events generally occur in swarms merging into tremors and precede dome collapse events and rock fall activities. Their occurrence is believed to indicate a pressurization of the volcanic system. Currently, systems for evaluating volcanic seismic events, such as satellite radar inferometry and electronic distance measurements do not provide data of sufficient resolution and timeliness to reliably correlate detected seismic activity to an impending eruption.

For the reasons stated above and for other reasons stated below which will become apparent to those skilled in the art upon reading and understanding the specification, there is a need in the art for improved volcanic eruption early detection techniques.

SUMMARY

The Embodiments of the present invention provide systems and methods for tracking and mapping transient conditions caused by geologic disturbances, in three dimensions and in real-time, and will be understood by reading and studying the following specification.

In one embodiment, a geological event monitoring system is provided. The system comprises a sensor array having a plurality of geologic activity sensors adapted to receive positioning signals from one or more Earth orbiting satellites and further adapted to receive a resolution enhancement signal from at least one reference station, the geologic activity sensors further adapted to measure motion activity; and a central monitoring system adapted to communicate with the sensor array, wherein the sensor array measures motion activity at a plurality of locations and transmits time stamped data characterizing the motion activity at the plurality of locations to the central monitoring system, the central monitoring system further adapted to correlate the time stamped data and track movement and inertial forces experienced by the plurality of geologic activity sensors over time.

In another embodiment, a geological movement monitoring system is provided. The system comprises means for receiving location data at a plurality of locations from one or more Earth orbiting satellites; means for enhancing the resolution of the location data based on one or more signals from at least one reference station; means for capturing inertial measurement data at the plurality of locations; means for time-stamping the location data and the inertial measurement data, the means for time-stamping responsive to the means for means for enhancing and the means for capturing inertial measurement data; means for transmitting the time-stamped location data and inertial measurement data, the means for transmitting responsive to the means for time-stamping; and means for correlating and evaluating the time-stamped location data and inertial measurement data to track movement and inertial forces experienced at the plurality of locations over time, the means for correlating and evaluating responsive to the means for transmitting.

In yet another embodiment, a method for monitoring geological events is provided. The method comprises capturing motion data including inertial data and location data with a sensor array having a plurality of sensors within a geographic area, wherein the location data is calculated based on signals received from one or more orbiting satellites; correcting the satellite based location data based on a signal from at least one reference station; time-stamping the motion data; correlating the time stamped motion data to form one or more multi-dimensional maps of the geographic area; and evaluating changes to the geographic area over time as depicted by the one or more multi-dimensional maps.

DRAWINGS

The present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout Figures and text.

DETAILED DESCRIPTION

Embodiments of the present invention solve problems associated with accurate volcanic eruption early detection techniques by providing a means to monitor threatening volcanoes in real-time and alarm locally as necessary. Early prediction of volcanic disturbances is enhanced by monitoring volcanic activity such as swelling of the landscape surrounding the volcano. Embodiments of the present invention provide enhanced capabilities for measuring and monitoring volcanic activity allowing volcano seismologists to map volcanic harmonics and resonance and map underground magma flow to predict volcanic eruptions. The data provided by embodiments of the present invention include real-time kinematic position data for a geographical region comprising a volcano landscape, by the use of a sensor array around the geologic area of interest. Should uncharacteristic movements, (such as swelling) occur, embodiments of the present invention provide data useful for predicting when an eruption will occur. With these predictions, authorities are able to issue appropriate evacuation warnings to people in harm's way.

Figure 1A:
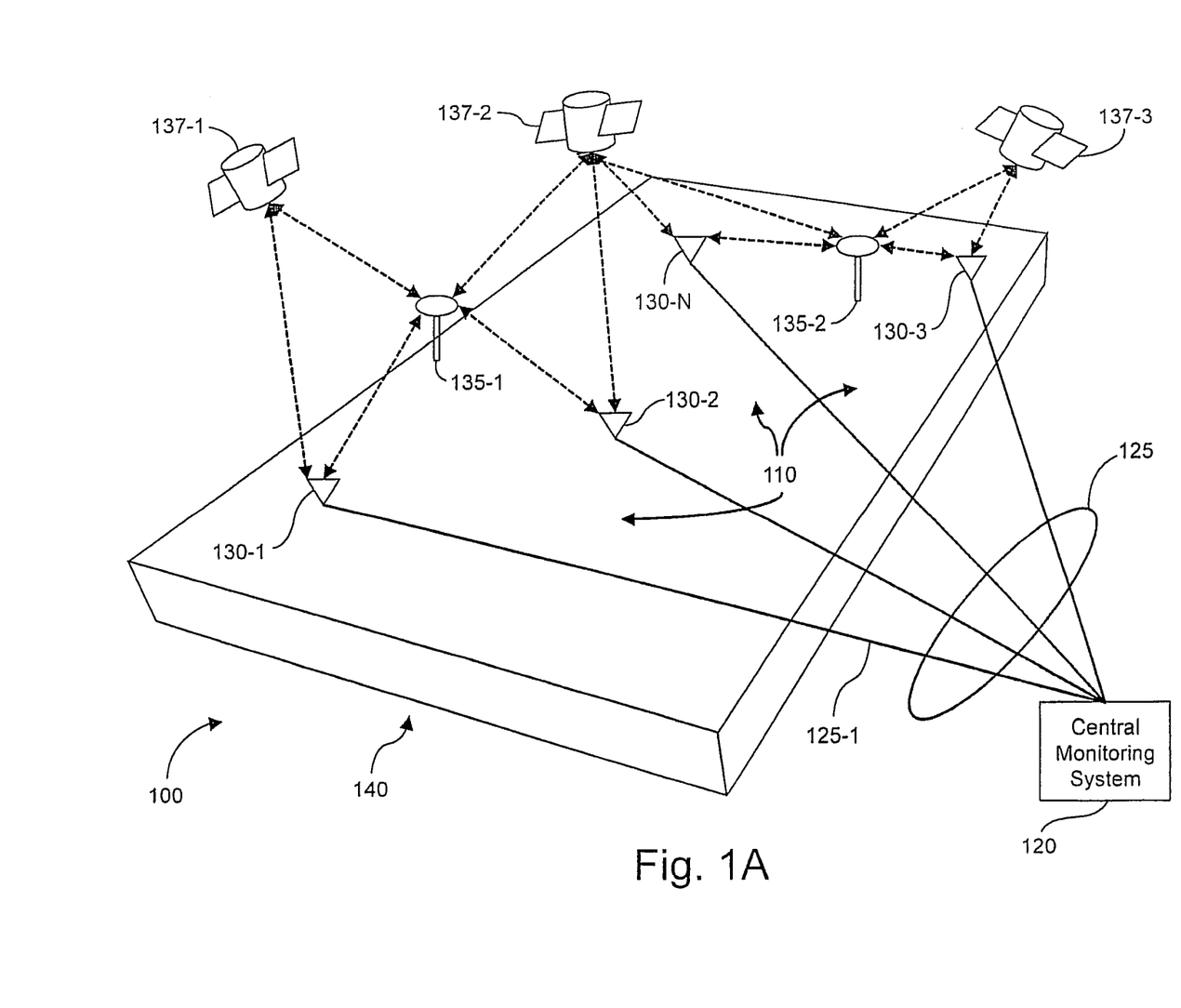
FIG. 1a is a diagram illustrating a sensor array and central monitoring system of one embodiment of the present invention.

As illustrated in FIG. 1a, a system 100 of one embodiment of the present invention comprises a high resolution sensor array 110 and a central monitoring system (CMS) 120. Sensor array 110 includes a plurality of geologic activity sensors 130-1 to 130-N, and one or more resolution enhancement aids, such as resolution enhancing reference stations 135-1 and 135-2. Sensor array 110 is dispersed across a geographical region 140, such as, but not limited to, a volcanic mountain or similar geologically active area. Geologic activity sensors 130-1 to 130-N send data to central monitoring system 120 through communications links 125.

Figure 1B:
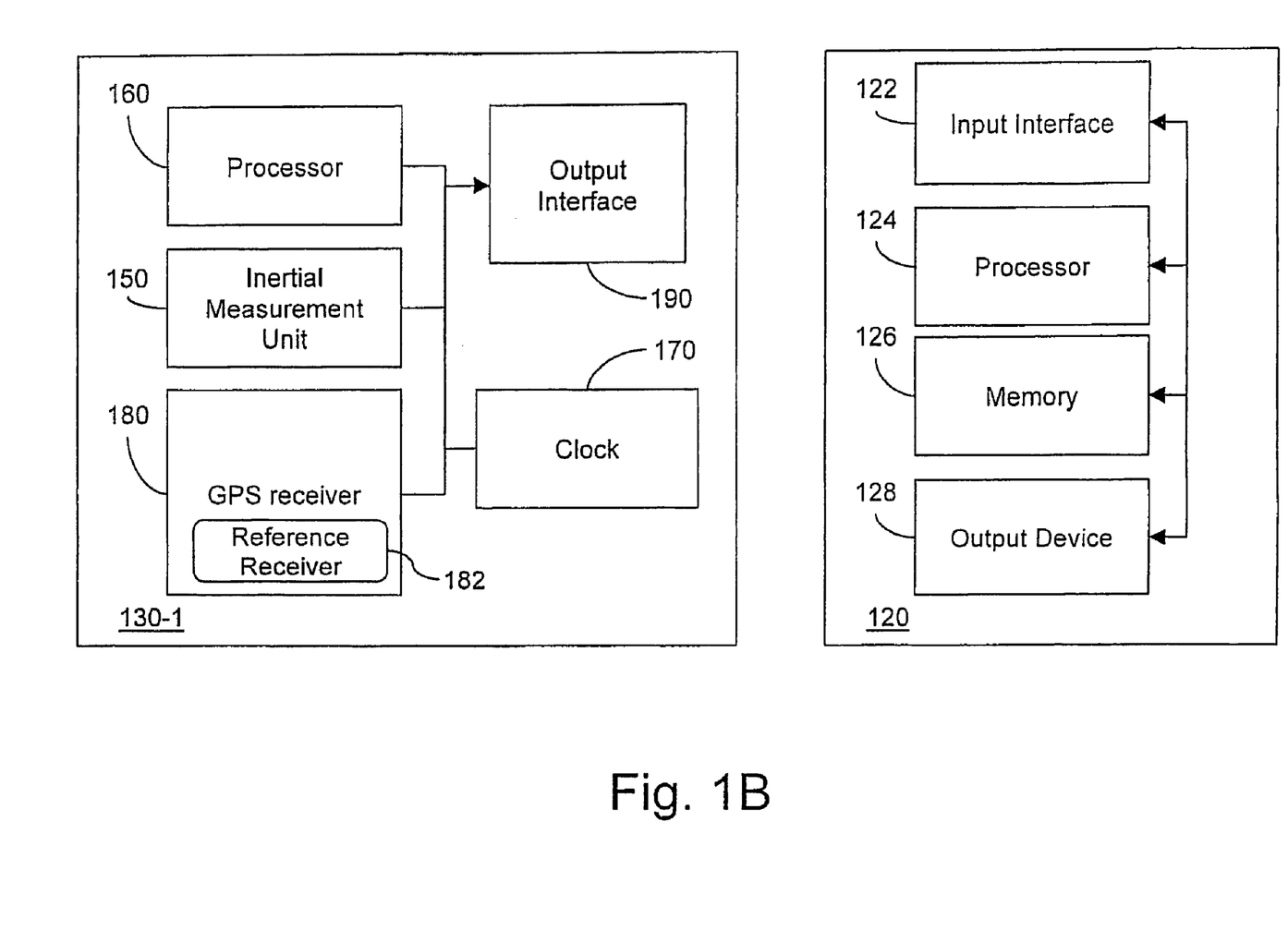
FIG. 1b is a block diagram illustrating a geologic activity sensor and a central monitoring system of one embodiment of the present invention.

FIG. 1b, illustrates one embodiment of a first geologic activity sensor 130-1 of the plurality of geologic activity sensors 130-1 to 130-N of the present invention. Geologic activity sensor 130-1 comprises a processor 160 coupled to received data from an inertial measurement unit 150, a clock 170, and a global positioning system (GPS) receiver 180. Processor 160 is further coupled to an output interface 190, in order to establish communications link 125-1 between central monitoring system 120 and geologic activity sensor 130-1.

Inertial measurement unit 150 allows sensor 130-1 to monitor and capture the sensor's attitude (e.g. the sensor's roll, pitch, and yaw), velocity (e.g. linear and rotational direction and magnitude), and forces such as accelerations (e.g. linear and rotational direction and magnitude). Global positioning system (GPS) receiver 180 enables sensor 130-1 to monitor and capture the sensor's position (e.g. longitude, latitude and altitude) and velocity based on signals from one or more GPS satellites 137-1 to 137-S. Clock 170 enables sensor 130-1 to time-stamp data as it is captured by inertial measurement unit 150 and global positioning system receiver 180. In one embodiment, clock 170 is adapted to receive a precision time signal from global positioning system receiver 180. In one embodiment, GPS receiver 180 is a software based GPS receiver. In an alternate embodiment, clock 170 is integrated into GPS receiver 180. In one embodiment, output interface 190 includes one or more of, but not limited to, a 1553B standard bus interface, an RS-422 data bus, an Ethernet interface, an optical fiber interface and a wireless RF interface, in order to establish communications link 125-1 with central monitoring system 120. In one embodiment, communications link 125-1 streams data from geologic activity sensors 130-1 to central monitoring system 120 via a communications media including, but not limited to fiberoptics, Ethernet, co-axial cable, wireless transmission, and the like.

In one embodiment, geologic activity sensor 130-1 includes one or more ruggedized GPS/INS navigation sensors, such as tactical grade micro electromechanical systems (MEMS) inertial sensors coupled with GPS receivers on a chip (e.g., a Honeywell BG1930).

In one embodiment, in operation, geologic activity sensors 130-1 to 130-N capture geologic activity data including changes in the attitude, position, acceleration and velocity of geological structures in geographical region 140. As illustrated below, these changes are indicative of magma flow beneath the Earth's surface.

Figure 2A:
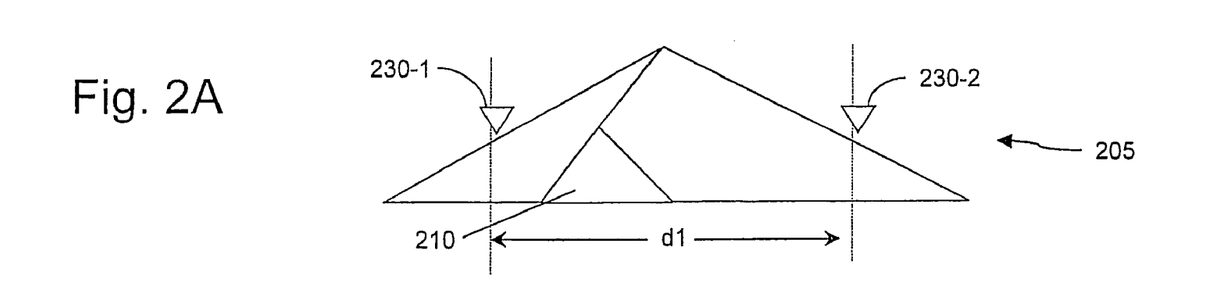
FIGS. 2a, 2b and 2c are illustrations of a sensor array one embodiment of the present invention.
Figure 2B:
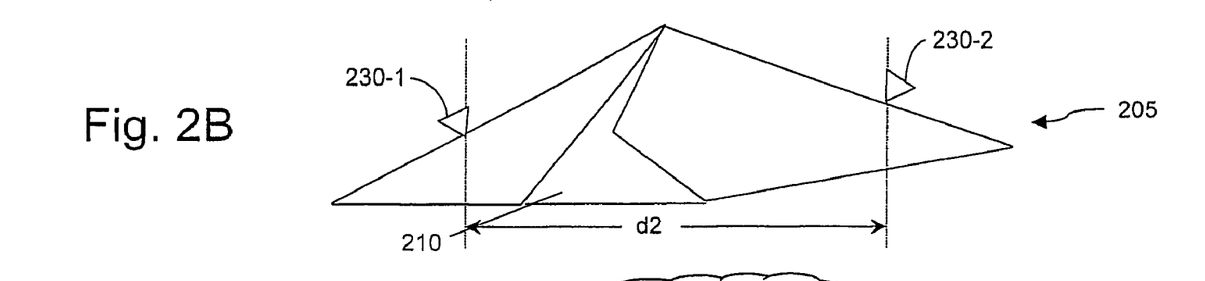
Figure 2C:
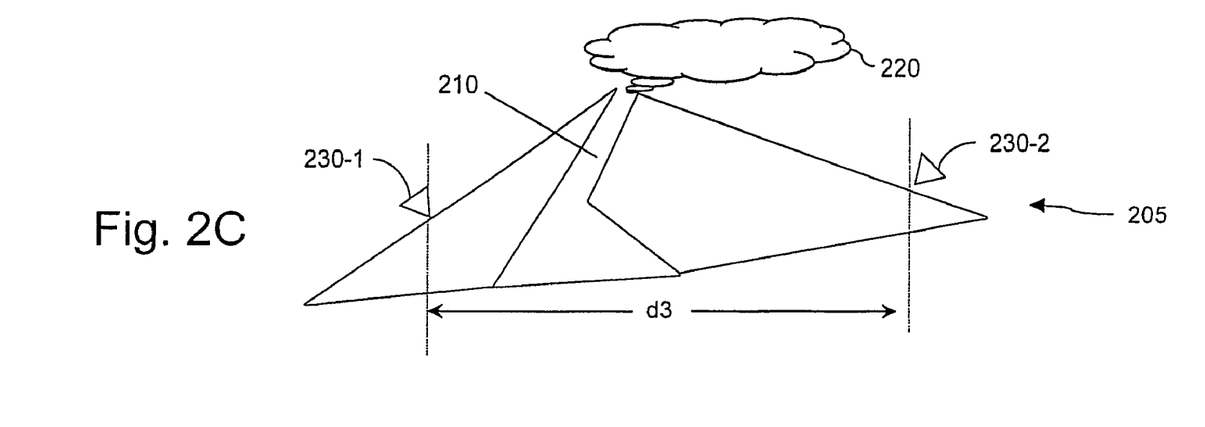

As illustrated in FIGS. 2a-c, in one embodiment, a plurality of geologic activity sensors, illustrated by geologic activity sensors 230-1 to 230-2, and at least one resolution enhancing reference station 235 are positioned on a volcanic mountain 205 to detect swelling caused by the movement of magma 210 within mountain 205. In addition, at least one reference station 235 enhances the resolution of position measurements by geologic activity sensors 230-1 to 230-2, as described with respect to reference stations 135-1 and 135-2 above. Additionally geologic activity sensors 230-1 to 230-2 provide increased kinematic accuracy (over sensors that measure position only) as a result of combining inertial data with GPS positioning data.

FIG. 2a illustrates geologic activity sensors 230-1 to 230-1 establishing a baseline condition for mountain 205 by establishing the initial positions of geologic activity sensors 230-1 and 230-2 having a relative distance from each other of distance d1. As illustrated by FIG. 2b, over time, when magma 210 migrates within mountain 205, the shape of mountain 205 swells, causing the displacement of one or both of geologic activity sensors 230-1 and 230-2. In one embodiment, the swelling of mountain 205 increased the relative distance between geologic activity sensors 230-1 and 230-2 from distance d1 to d2. The continued swelling of mountain 205, as shown in FIG. 2c is further captured by geologic activity sensors 230-1 and 230-2 as the relative distance between the sensors increases to d3, until an eruption occurs releasing one of both of magma 210 and gasses 220. Geologic activity sensors, such as sensors 230-1 and 230-2, scattered across mountain 205 capture position, attitude, velocity and acceleration data as the shape of mountain 205 changes due to the force of the moving magma 210. The data captured by the sensors is sent to a central monitoring system, such as central monitoring system 120, where the data is evaluated as described below. From the physical displacement measured in mountain 205 over time, the location of magma 310 is tracked. Any acceleration in the rate of swelling, indicative of an impending eruption is captured by the data collected by sensors 230-1 and 230-2 and made available to central monitoring system 120.

Figure 3A:
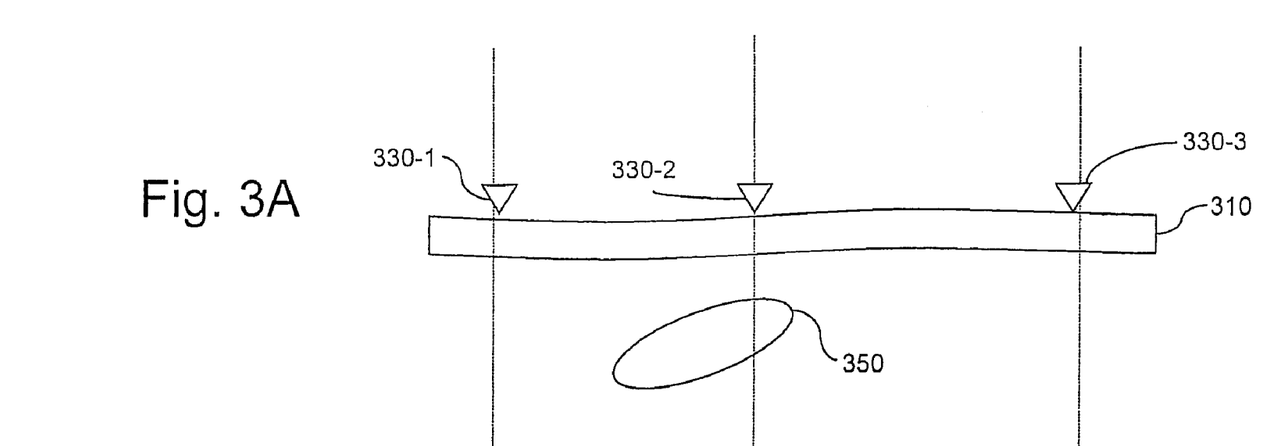
FIGS. 3a and 3b are illustrations of a sensor array of one embodiment of the present invention.
Figure 3B:
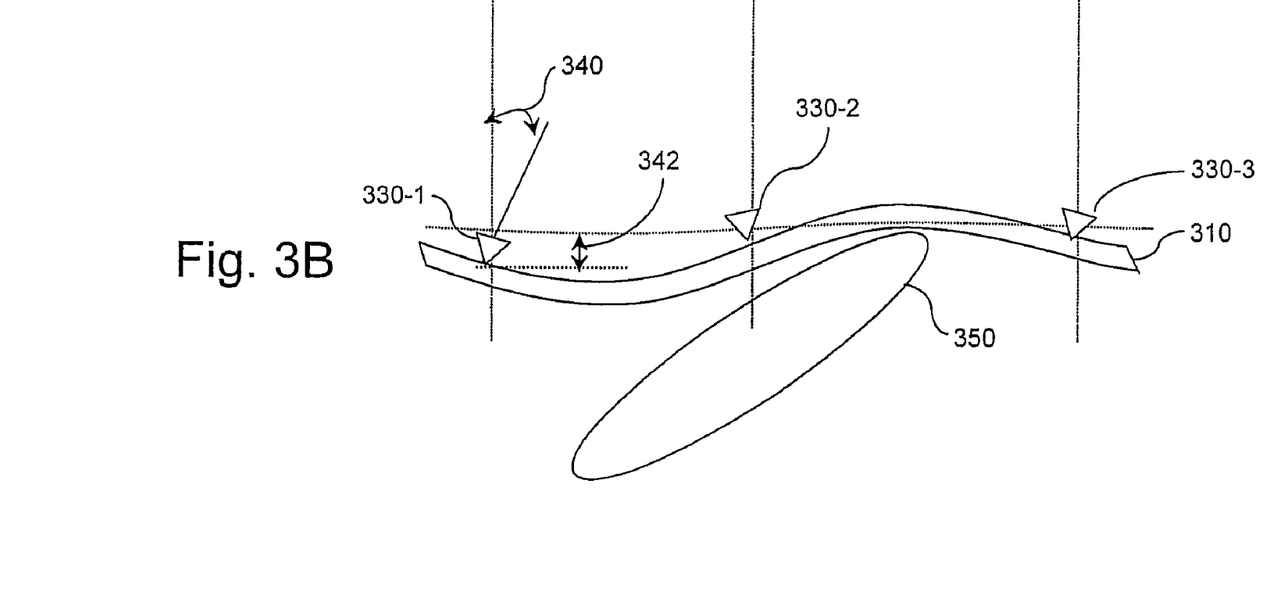

Embodiments of the present invention are also useful for mapping underground magma flows based on changes in the attitude of geologic activity sensors. As illustrated in FIG. 3a, a plurality of geologic activity sensors and at least one reference station, illustrated by geologic activity sensors 330-1 to 330-3 and reference station 335, are positioned to measure changes in shape of a region of the Earth's surface 310 due to one or more pockets of underground magma 350. As the location and shape of the pocket of magma 350 changes, the Earth's surface 310 warps in response to forces exerted by shifting magma 350, as illustrated by FIG. 3b. When magma 350 moves, geologic activity sensors 330-1 to 330-3 each measures its own three dimensional position displacement (illustrated generally at 342), attitude change (illustrated generally at 340), velocity and the magnitude of acceleration forces acting upon it and send this data to a central monitoring system, such as central monitoring system 120.

In one embodiment, each of geologic activity sensors 330-1 to 330-3 transmits the data to central monitoring system 120 via communication links 125. By correlating the coherent data generated from geologic activity sensors 330-1 to 330-3, central monitoring system 120 can calculate the location, speed and direction of magma 350, as well as the frequency and amplitude of waves in surface 310 produced by magma 350 propagating through the Earth. In one embodiment, based on data from geologic activity sensors 330-1 to 330-3, central monitoring system 120 is adapted to generate a three dimensional representation of acceleration forces acting on surface 310. In one embodiment, based on data from geologic activity sensors 330-1 to 330-3, central monitoring system 120 is adapted to generate a three dimensional representation of the physical displacement of geological structures within surface 310. Besides providing an early warning of a volcanic eruption, mapping of magma flows as described above allow those interested in drilling in areas known to be volcanically active to map the location of magma pockets in a region in order to choose drilling locations by monitoring localized activity. Additional uses for embodiments of the present invention include, but are not limited to, tracking glacier movement, soil movement due to sinkholes, clay and other natural phenomena and structural resonance movement of man-made structures, such as bridges and buildings.

As would be readily recognized by one skilled in the art upon reading this specification and the illustration of FIGS. 2a-c and 3a-b, additional benefits of using coherent data from multiple geographical activity sensors include that a central monitoring system can identify local disturbances affecting only an isolated number of geologic activity sensors and differentiate them from disturbances affecting larger areas.

Referring back to FIG. 1a, position data captured by geologic activity sensors 130-1 to 130-N of embodiments of the present invention achieves the resolution required to detect underground magma flows by correcting position data received from GPS satellites 137-1 to 137-S based on the one or more reference stations (shown as reference stations 135-1 and 135-2) located strategically around geographical region 140. Reference stations 135-1 and 135-2 are illustrated as ground-based stations, but embodiments encompassing non-ground base reference stations are within the scope of the present invention. In one embodiment, GPS receiver 180 includes a reference receiver 182 for obtaining correction signals transmitted from reference stations 135-1 and 135-2. In one embodiment, geologic activity sensor 130-1 uses Differential GPS (DGPS) corrections obtained from reference stations 135-1 and 135-2 for improving the resolution and consistency of position data and negating any atmospheric effects on satellite GPS signals. In that case, reference receiver 182 is a DGPS capable receiver for obtaining DGPS PR and deltarange (DR) corrections, which would be transmitted from reference stations 135-1 and 135-2. In one embodiment, GPS receiver 180 employs various carrier and phase smoothing techniques for improving its position solution. In one embodiment, processor 160 implements a Kalman filter for carrier smoothing and combining inertial measurement data and corrected GPS data. In an alternate embodiment, reference stations 135-1 and 135-2 implement other means to enhance position data resolution, such as, but not limited to, a localized ultra-wideband (UWB) positioning signal broadcast by reference stations 135-1 and 135-2. In one embodiment, in combination with the data provided by inertial measurement unit 150, geologic activity sensor 130-1 provides millimeter real-time position accuracy of structures in geographical region 140 in the proximity of geologic activity sensor 130-1.

As data is captured by inertial measurement unit 150 and GPS receiver 180, clock 170 time stamps each data sample with the precise time the data sample was captured. Geologic activity sensor 110 communicates the time stamped attitude, position, acceleration and velocity data to central monitoring system 120 through the communication link provided by output interface 190. In one embodiment, data communicated to central monitoring system 120 further includes identification information enabling central monitoring system 120 to know which of geologic activity sensors 130-1 to 130-N incoming data is from, as well as, but not limited to, status bits, health bits, and other sensor data.

Referring back to FIG. 1b, in one embodiment, central monitoring system 120 comprises an input interface 122 adapted to communicate with the plurality of geologic activity sensors 130-1 to 130-N, a processor 124, a memory 126, and an output device 128. In one embodiment, output device 128 includes one or more of a video display terminal and a printer.

In operation, geologic activity data from sensor array 110 is collected by central monitoring system 120 via communications link 125. In one embodiment, geologic activity data captured from each of the plurality of geologic activity sensors 130-1 to 130-N, is transmitted to central monitoring system 120 in real-time, as it is captured. In one embodiment, central monitoring system 120 receives the time-stamped activity data from geologic activity sensors 130-1 to 130-N, and creates a multi-dimensional map from the activity data which illustrates movement within geologic area 140 indicative of volcanic activity, such as, but not limited to, magma flow or an eruption. Thus, this system enables regional authorities to observe in the real-time any deviations to the nominal landscape conditions, and to aid in saving lives when a volcanic eruption is immanent.

There are several means available to those skilled in the art to create a multi-dimensional map from data simultaneously collected from a multitude of sampling points, such as the above described geologic activity data. As one example, in one embodiment of the present invention, central monitoring system 120 creates an activity vector comprising two or more activity data samples acquired from a first geologic activity sensor 130-1 of geologic activity sensors 130-1 to 130-N. Activity data samples comprising the geologic activity sensor's roll, pitch, and yaw, longitude, latitude, altitude and linear acceleration magnitude, all captured at a single point in time, form an eight-dimensional activity vector, which can be expressed as:

Activity_1(roll, pitch, yaw, longitude, latitude, altitude, linear acceleration magnitude, time_n)

Activity_1 is essentially a snapshot of activity data samples captured by the geologic activity sensor 130-1 at time_n.

In one embodiment, central monitoring system 120 is adapted to generate a multi-dimensional graphical representation of vector Activity_1. In one embodiment, central monitoring system 120 is adapted to receive a string of m vectors, such as Activity_1, comprising activity data samples acquired from first geologic activity sensor 130-1 at times time_n to time_n+m. With this string of vectors, central monitoring system 120 is enabled to plot one or more dimensions of the string of vectors over the time interval from time_n to time_n+m. For instance, in one embodiment, central monitoring system 120 plots the linear acceleration magnitude, experienced by geological activity sensor 130-1 from time_n to time_n+m. In another embodiment, central monitoring system 120 generates a graphical representation of the roll, pitch and yaw of geological activity sensor 130-1 from time_n to time_n+m. With the plurality of activity vectors, central monitoring system 120 is enabled to generate a three dimensional map of geologic activity data captured over geographical region 140.

In one embodiment, central monitoring system 120 generates a map comprising attitude, position, acceleration and velocity data based on a plurality of activity vectors from the plurality of geologic activity sensors 130-1 to 130-N at a particular instant of time. Central monitoring system 120 correlates the activity data received from sensor array 110 based on the precision time stamps, and generates a moving map of geological disturbances in geographical region 140 in real-time. As explained above, changes in those activity vectors over time potentially indicate a movement of magma beneath the Earth's surface which can be mapped over time through the analysis of the activity vectors. Additionally, as one or more transient waves generated by volcanic activity travels through geographical region 140, sudden changes in the attitude, position, velocity and acceleration forces experienced by each of the plurality of geologic activity sensors 130-1 to 130-N provide data to central monitoring system 120 for anticipating a volcanic eruption.

Figure 4:
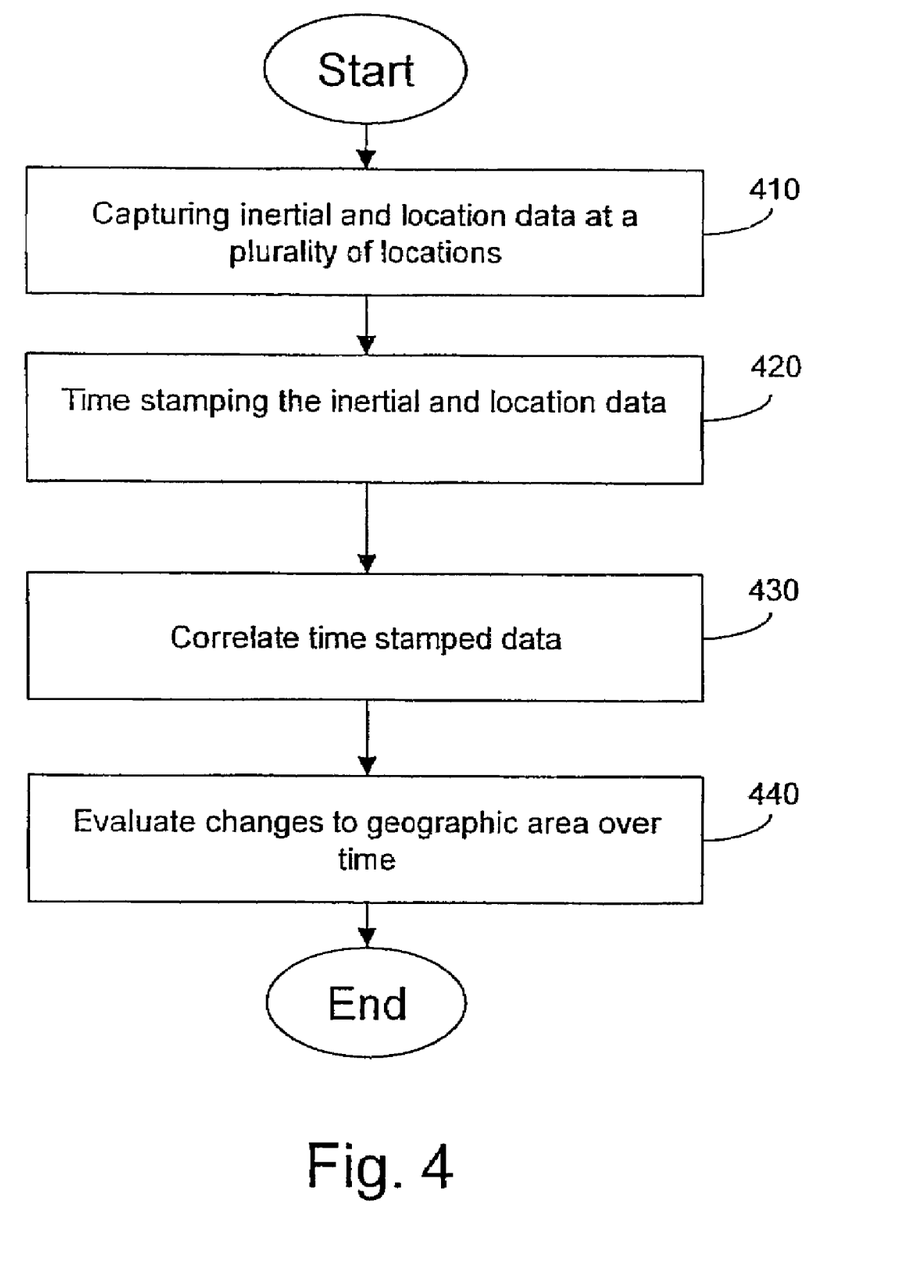
FIG. 4 is a flow diagram illustrating a method for detecting motion one embodiment of the present invention.

FIG. 4 provides a flow chart illustrating a method for monitoring geological events of one embodiment of the present invention. The method begins at 410 with capturing inertial and location data with a sensor array having a plurality of sensors within a geographic area. In one embodiment, the inertial data comprises change in attitude (roll, pitch, and yaw), velocity (linear and rotational direction and magnitude), and forces such as accelerations (e.g. linear and rotational direction and magnitude) at each of the plurality of locations. In one embodiment, the location data comprises GPS location data received from a satellite and corrected by a signal from one or more reference stations, such as but not limited to a DGPS reference station. The method continues at 420 with time stamping the inertial and location data. Applying a time stamp to the inertial and location data allows use of the data captured at a single instance of time by the sensor array to form a snapshot of both the displacement and forces affecting a geographic area. Comparison of two or more of such snapshots can be used to reveal subterranean movements due to volcanic activity. Thus, the time stamped motion data from the sensor array is correlated at 430 to form one or more multi-dimensional maps. The method proceeds to 440 with evaluating changes to the geographic area over time, as depicted by multi-dimensional maps that capture snapshots of the geographic area across a period of time.

Several means are available to implement the central monitoring system of the current invention. These means include, but are not limited to, digital computer systems, programmable controllers, or field programmable gate arrays. Therefore other embodiments of the present invention are program instructions resident on computer readable media which when implemented by such controllers, enable the controllers to implement embodiments of the present invention. Computer readable media include any form of computer memory, including but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A geological event monitoring system, the system comprising:
   a sensor array having a plurality of geologic activity sensors adapted to receive positioning signals from one or more Earth orbiting satellites and further adapted to receive a resolution enhancement signal from at least one reference station, the geologic activity sensors each further adapted to measure roll, pitch, and yaw activity in both attitude and acceleration; and
   a central monitoring system adapted to communicate with the sensor array, wherein the sensor array measures roll, pitch, and yaw activity at a plurality of locations and transmits time stamped data characterizing the roll, pitch, and yaw activity at the plurality of locations to the central monitoring system, the central monitoring system further adapted to correlate the time stamped data and track movement and inertial forces experienced by the plurality of geologic activity sensors over time.

2. The system of claim 1, wherein sensor array is adapted to measure motion activity comprising position information for each of the plurality of geologic activity sensors and inertial forces acting on each of the plurality of geologic activity sensors.

3. The system of claim 1, wherein the central monitoring system is further adapted to track the movement of at least one of subterranean magma propagating across a geographic area, soil, a glacier, and a man-made structure.

4. The system of claim 1, wherein the central monitoring system is further adapted to track swelling of a surface due to volcanic activity.

5. The system of claim 1, wherein the central monitoring system is further adapted to track the location and intensity of a wave propagating through a geographic area, generated by volcanic activity.

6. The system of claim 5, wherein the central monitoring system is further adapted to calculate one or more of frequency, amplitude, speed and direction of the wave propagating through a geographic area.

7. The system of claim 1, wherein the central monitoring system is further adapted to generate one or more three dimensional representations of movement and inertial forces experienced by the plurality of geologic activity sensors based on correlated time stamped data.

8. The system of claim 1, wherein each geologic activity sensor is adapted to monitor and capture motion data including at least one of attitude, position, acceleration, and velocity of the geologic activity sensor; and
   wherein each geologic activity sensor is further adapted to time stamp the motion data.

9. The system of claim 1, wherein each geologic activity sensor further comprises an inertial measurement unit having at least one gyroscope and at least one accelerometer.

10. The system of claim 1, wherein each geologic activity sensor further comprises:
    a GPS receiver adapted to output one or both of the geologic activity sensor's position and velocity.

11. The system of claim 1, wherein one or more of the plurality of geologic activity sensors is an inertial navigation unit adapted with a Global Positioning System receiver and further adapted to receive a correction signal from at least one Differential Global Positioning System reference station.

12. The system of claim 1, wherein one or more of the plurality of geologic activity sensors is an inertial navigation unit adapted with a Global Positioning System receiver and further adapted to receive a correction signal from at least one ultra-wideband localizer reference station.

13. A geological movement monitoring system, the system comprising:
    means for receiving location data at a plurality of locations from one or more Earth orbiting satellites;
    means for enhancing the resolution of the location data based on one or more signals from at least one reference station;
    means for capturing inertial measurement data at the plurality of locations; p1 means for capturing roll, pitch, and yaw data in both attitude and acceleration at the plurality of locations;
    means for time-stamping the location data and the inertial measurement data, the means for time-stamping responsive to the means for means for enhancing and the means for capturing inertial measurement data;

means for transmitting the time-stamped location data, roll, pitch, and yaw data, and inertial measurement data, the means for transmitting responsive to the means for time-stamping; and means for correlating and evaluating the time-stamped location data, roll, pitch, and yaw data, and inertial measurement data to track movement and inertial forces experienced at the plurality of locations over time, the means for correlating and evaluating responsive to the means for transmitting.

14. The system of claim 13, wherein the means for correlating and evaluating is further adapted to tracking one or more waves generated by volcanic activity.

15. The system of claim 13, wherein the means for correlating and evaluating is further adapted to generate one or more multi-dimensional representations of a geographic area based on the correlated time-stamped location data and inertial measurement data.

16. A method for monitoring geological events, the method comprising:

capturing motion data including inertial data, roll, pitch, and yaw data in both attitude and acceleration, and location data with a sensor array having a plurality of sensors within a geographic area, wherein the location data is calculated based on signals received from one or more orbiting satellites;

correcting the satellite based location data based on a signal from at least one reference station;

time-stamping the motion data;

correlating the time stamped motion data to form one or more multi-dimensional maps of the geographic area; and evaluating changes to the geographic area over time as depicted by the one or more multi-dimensional maps.

17. The method of claim 16, wherein capturing location data further comprises receiving a signal from at least one global positioning system satellite.

18. The method of claim 17, wherein correcting the satellite based location data further comprises receiving a correction signal from one or more differential global positioning system reference stations.

19. The method of claim 17, wherein correcting the satellite based location data further comprises receiving a correction signal from one or more ultra-wideband localizer reference stations.

20. The method of claim 16, the method further comprising:

calculating one or more of frequency, amplitude, speed and direction of one or more waves generated by volcanic activity.

21. The method of claim 16, wherein capturing motion data includes capturing at least one of attitude, position, acceleration, and velocity data.

* * * * *